Nov. 20, 1951     W. G. MITCHELL     2,575,525
POWER OPERATED SCREW STICK SCREW DRIVER
Filed March 27, 1948     4 Sheets-Sheet 2

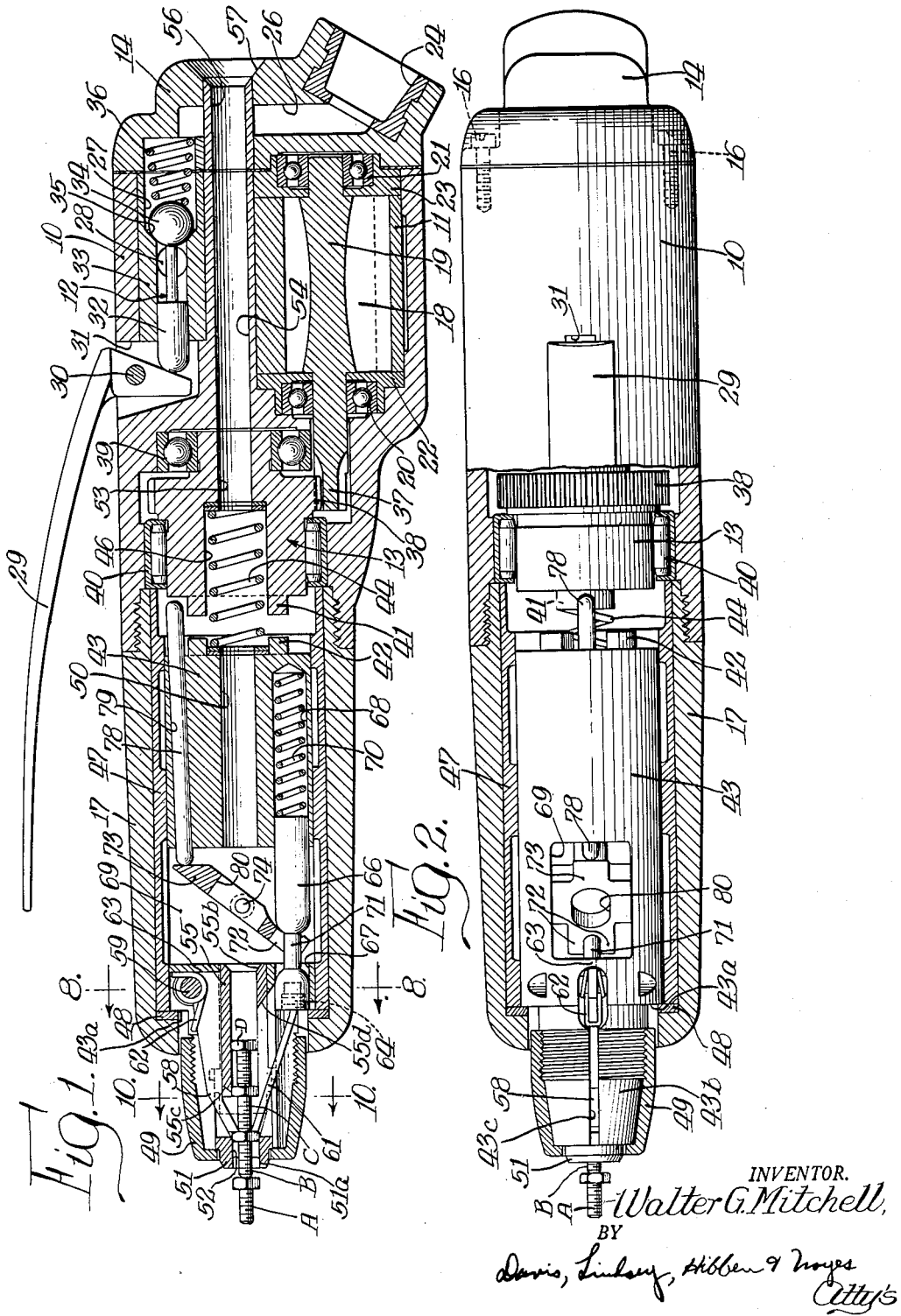

INVENTOR.
Walter G. Mitchell,
BY
Davis, Lindsey, Hibben & Noyes
Attys.

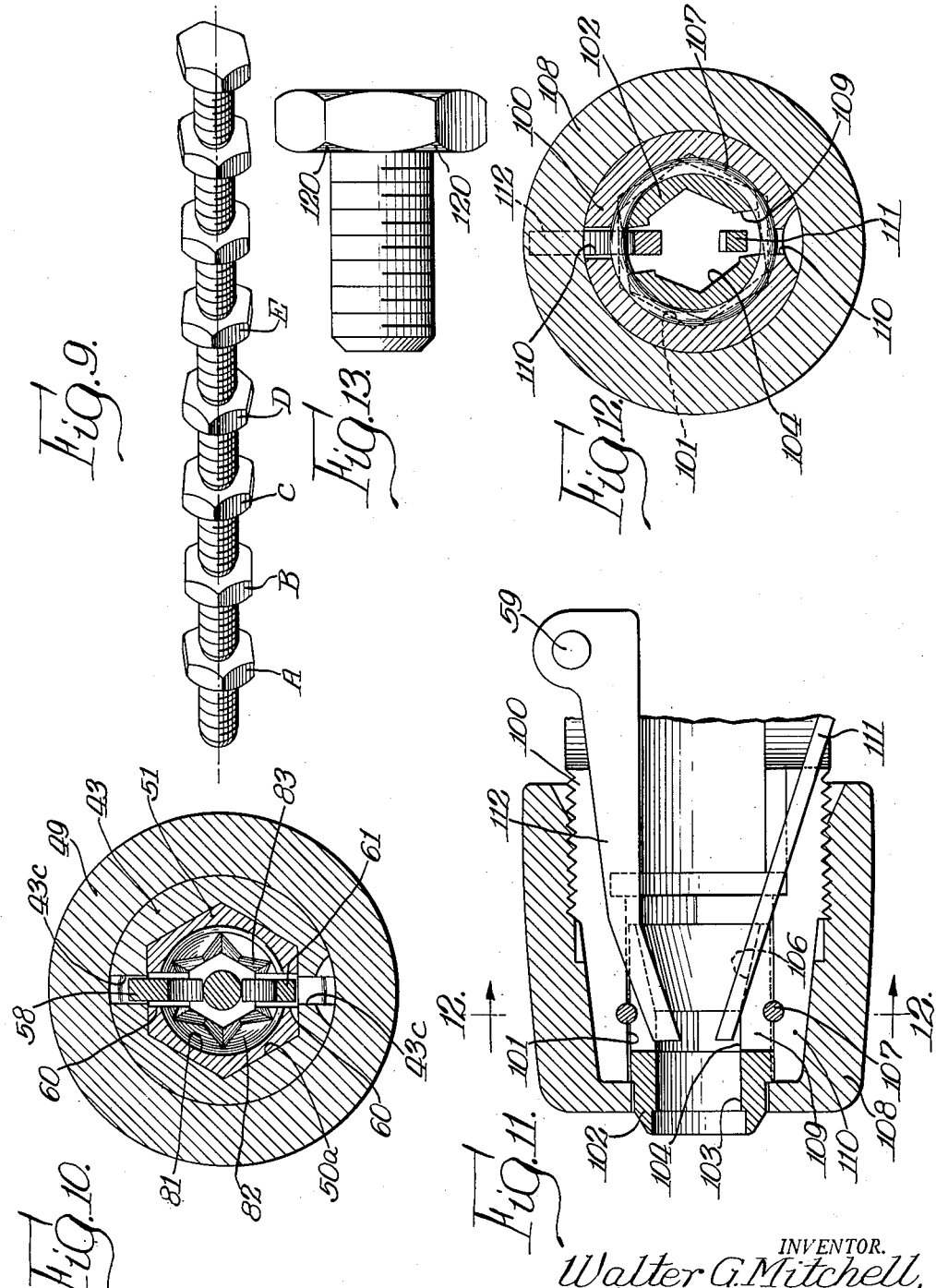

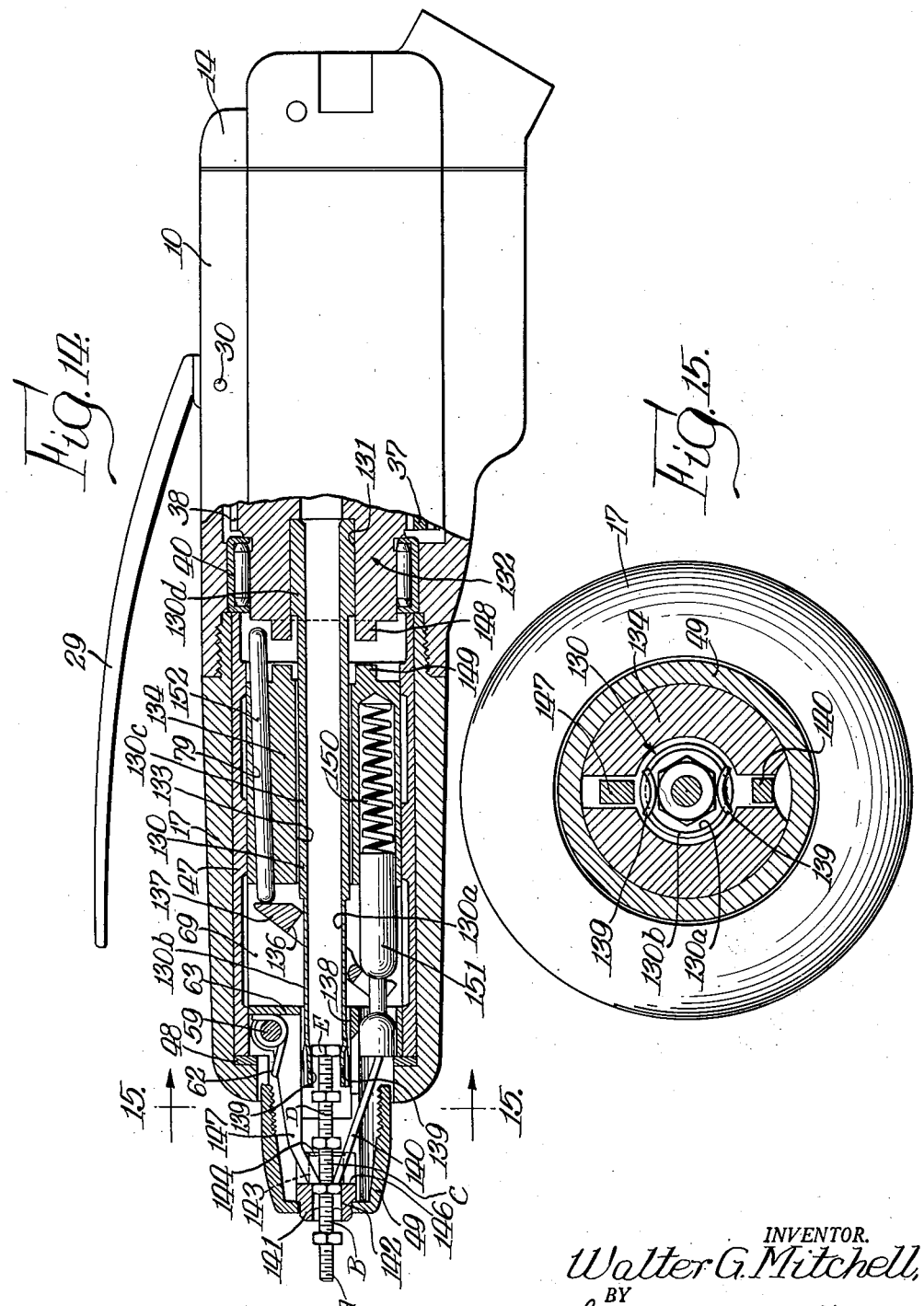

Patented Nov. 20, 1951

2,575,525

UNITED STATES PATENT OFFICE 2,575,525

POWER OPERATED SCREW STICK SCREW DRIVER

Walter G. Mitchell, Aurora, Ill., assignor to Independent Pneumatic Tool Company, Chicago, Ill., a corporation of Delaware Application March 27, 1948, Serial No. 17,561

29 Claims. (Cl. 144—32)

This invention relates to screw drivers, and more particularly to a screw driver adapted to drive into work the successive screws of a screw stick in which a plurality of screws are integrally formed with the threaded shank of one screw being connected by a thin frangible neck to the head of another, as shown in the Hutchison Patent No. 2,247,499 of July 1, 1941.

Heretofore, difficulty has been experienced in utilizing screw drivers of screw sticks for rapid, automatic operation. One of the principal sources of such difficulty was the fact that a stick of screws, because of its inherent nature and method of production, was normally twisted or spiraled from one end to the other so that the heads of the respective screws were out of alignment, the vertical side faces of one hexagonal head being angularly disposed relative to another. As a result of this misalignment, the stick of screws was not capable of being fed rapidly, if at all, into the driving section of the tool wherein a driving chuck having a driving surface coincidental therewith was adapted to engage the screw head. If the head of one screw was in proper driving engagement in the bore of the driving section, the head of the next successive screw in most instances was twisted out of alignment therewith and hence would be unable to enter the driving bore without sticking or jamming and without manual adjustment.

Another difficulty that has been experienced has arisen from the undesirable construction and operation of the screw advancing and holding members which were of one piece construction and in the form of elongated, circular spring wires, which tended to become distorted and bent so as to fail to properly engage the successive screws of a stick. When the screw to be driven was placed against a piece of work and relative axial driving pressure was applied, the holding member because of its round, one piece construction was incapable of withstanding such pressures and quickly failed when the applying pressures were extreme due to inexpert handling of the tool. It consequently became bent and thereafter was unable to engage and hold steadily the head of a screw, thus resulting in looseness and faulty driving engagement between the parts.

Furthermore, the screw drivers for use in driving screw sticks that have, heretofore, been devised and used have either been manually operated or have comprised relatively large and cumbersome bench machines. The manually rotatable drivers were incapable of rapid and efficient operation and their productive capacity was determined primarily by the skill of the operator. Similarly, the bench drivers were limited in their application since the work had to be brought to them due to their non-portable nature. Consequently, up until the advent of the present invention no successful portable power screw driver for use with screw sticks has been devised and operated and the field of application, therefore, has been relatively limited.

It is, therefore, one of the principal objects of the present invention to provide a portable, power driven screw driver adapted to drive successively into work the screws of a screw stick.

Another object of the present invention is to provide a portable, power driven screw driver adapted to drive the screws of a screw stick and through which a stick of screws may be automatically fed in a rapid, efficient manner.

Another object of the invention is to provide an adjusting means for effecting relative rotational movement between the screw stick and the driving assembly upon advancement of the screw stick whereby a screw will be properly aligned with the driving section for ready entry therein.

Still another object is to provide a screw driver for driving the screws of a screw stick having a chuck or driving section and a feed portion for receiving and adjusting a screw into proper alignment with the driving section for ready entry therein.

A further object is to provide a screw stick driver having a chuck or driving section and a feed-in portion for the chuck which comprises at least one tapering cam surface adapted to receive and adjust a screw into proper alignment with the driving section for ready entry therein.

A further object is to provide a screw stick driver having provision for adjusting the screw stick and the driving chuck relative to each other so that the screw stick may be readily fed into driving engagement therein.

A further object is to provide a screw stick adjusting means that is operably connected with the driving element for continuous rotative movement therewith and which is adapted to engage the screw stick to effect rotation thereof during advancement of the screw stick whereby a screw may be adjusted into proper alignment with the screw engaging section for ready entry therein.

A still further object is to provide screw holding means and screw advancing means for a screw stick driver which are of strong construction to withstand longitudinal pressures without distortion but which are yieldably mounted to permit advancement of the screw stick longitudinally thereof.

Another further object is to provide a portable, power driven screw stick driver that is of simple and inexpensive construction providing for rapid assembly and service and which is capable of rapid and efficient operation without failure over a long operable life.

Another object is to provide a portable power driven screw stick driver having a screw driving section which is adapted to be driven upon relative longitudinal movement of the driving parts into clutched driving engagement and through which a stick of screws may be automatically fed when driving engagement between the parts is broken off and they are being returned to inoperative position.

Another object is to provide a portable power driven screw stick driver having a slidably mounted driving section longitudinally movable to and from clutched engagement with a rotatable driving member and including a screw advancing mechanism adapted to feed the screw stick through the driver when the driving section is returned to declutched position.

Still another object is to provide a portable power driven screw stick driver having a cylindrical driving member or cage carrying a driving chuck at its lower end and a clutch element in its other end for engagement with a motor driven clutch member upon relative slidable movement of the cage and including a screw advancing mechanism for retracting an advancing pawl to pick up the next successive screw when the cage is moved to clutched position and for returning the pawl to lowered position and to advance the screw stick when the parts are moved to declutched position.

Other and further objects and advantages of the present invention will become apparent as this description progresses, reference being had to the accompanying drawings, in which:

Figure 1 is a longitudinal, vertical sectional view of a screw stick driver comprising one embodiment of the present invention and showing the parts in their non-driving positions;

Fig. 2 is a top plan view of the driver with the front portions of the casing or housing thereof being broken away and shown in section;

Fig. 3 is a longitudinal, vertical sectional view of the forward portion of the driver showing the relative positions of the various parts when in operating, screw driving position;

Fig. 4 is a transverse sectional view taken on the line 4—4 in Fig. 3, looking forwardly of the driver in the direction of the arrows;

Fig. 5 is a transverse sectional view taken on the line 5, looking rearwardly of the driver in the direction of the arrows;

Fig. 6 is an enlarged longitudinal, vertical sectional view of the front end of the driver showing the details of construction of the driving chuck;

Fig. 7 is a transverse sectional view taken on the line 7—7 in Fig. 6, looking in the direction of the arrows;

Fig. 8 is a transverse sectional view taken on the line 8—8 in Fig. 1, looking in the direction of the arrows;

Fig. 9 is a perspective view of a stick of screws showing the normal twisted condition thereof and the misalignment of the hexagonal screw heads;

Fig. 10 is an enlarged transverse, vertical sectional view taken on the line 10—10 in Fig. 1, looking in the direction of the arrows;

Fig. 11 is a fragmentary, longitudinal vertical sectional view of a modified form of chuck and driving cylinder;

Fig. 12 is a transverse sectional view taken on the line 12—12 in Fig. 11, looking in the direction of the arrows.

Fig. 13 is an enlarged elevational view of one of the screws of the stick showing the curved tapering faces on the under side of the screw head adjacent the apices thereof;

Fig. 14 is a fragmentary, longitudinal vertical sectional view of another form of screw stick adjusting means comprising the present invention; and Fig. 15 is an enlarged transverse, sectional view taken on the line 15—15 in Fig. 14.

As shown more particularly in Figs. 1 and 2 of the drawings, the screw stick driver comprising a preferred embodiment of the present invention has a main frame or supporting casing 10 in which is housed a rotary pneumatic motor 11, a valve mechanism 12 and a driving gear 13. The upper or rear end of the main casing 10 is closed by a cap member 14 secured thereto by means of bolts or screws 16, and to the lower or forward end of the casing 10 there is threadedly secured an elongated cylindrical housing 17.

The motor 11 which may be of conventional type comprises a plurality of radial blades or vanes 18 and a rotor 19, the rotor 19 being supported for free rotative movement by ball bearing units 20 and 21 mounted in end plates 22 and 23 which serve to complete the motor cylinder. Air under pressure is supplied to the motor 11 through an opening 24 in the rear cap member 14 in which a coupling device of an air line (not shown) may be detachably secured. A vertical air passage 26 connects the opening 24 with a longitudinal air passage 27 formed in the upper portions of the main casing 10 and the cap member 14, and air from the air passage 27 is finally conducted to the motor 11 by an air duct 28. The passage of air to the air duct 28 is controlled by means of an elongated lever 29 which is pivoted to the upper portion of the main casing 10 by a transverse pin 30 and extends forwardly of the tool over the cylindrical housing 17. The inner end of the lever 29, which extends downwardly within a recess 31 in the upper portion of the casing 10, bears against the forward end of a plunger 32 slidably mounted within a valve body 33 pressed within the casing 10. The rearward end of the plunger 32 bears against a ball valve 34 which is urged against the tapered seat 35 of the valve body 33 by means of a spring 36 compressed within the enlarged portion of the air passage 27 by the rear cap member 14. Thus, when the lever 29 is depressed by the operator toward the housing 17, the plunger 32 is forced rearwardly moving the ball valve 34 off its seat and thereby permitting air to flow from the passage 27 into the duct 28 to the motor 11 for operation thereof.

The forward or lower end of the rotor 19 of the air motor 11 comprises an integrally formed gear 37 which is in constant mesh with the gear teeth 38 of the elongated longitudinal gear 13. The gear 13 is supported for free rotative movement within the casing 10 by a ball bearing unit 39 in which is received the reduced upper or rear end of the gear 13 and also by a needle type bearing 40 in engagement with the intermediate portion thereof.

The lower or forward end of the gear 13 is formed with integral clutch teeth 41 which are adapted to mesh with and drive clutch teeth 42 formed on the upper, rear end of a rotatable chuck carrier 43 in the form of a cylindrical barrel or cage. The chuck carrier 43 is supported within the cylindrical housing 17 for free rotative movement and also for limited longitudinal movement relative thereto and is constantly urged toward the forward end of the housing 17 by a spring 44 confined between the inner end of a large bore 46 in the gear 13 and the upper face of the chuck carrier 43. The spring 44 is adapted to be compressed when the leading screw A of the screw stick is pressed into engagement with the work, whereby the chuck carrier 43 is forced rearwardly so as to bring the clutch teeth 42 into mesh with the clutch teeth 41. When engagement between the clutch teeth is completed and the motor is caused to operate, rotation of the chuck carrier 43 is effected so as to drive the screw A into the work.

The cylindrical housing 17 is lined with a cylindrical bushing 47 of bearing bronze or other suitable material against which the chuck carrier 43 slides in its rotative and longitudinal movements, and it is also provided with a thrust washer 48 at its inturned or restricted lower end against which the annular shoulder 43a of the chuck carrier 43 abuts, thus limiting forward movement of the carrier relative to the housing. The lower or forward end 43b of the chuck carrier 43 is of reduced diameter and projects through the opening in the lower end of the housing 17, and this end 43b is enclosed within and is in threaded engagement with a retaining cap nut 49. As shown more particularly in Figs. 1, 2, 3, 6 and 7, the carrier 43 is provided with an axial bore 50 which extends therethrough and is enlarged at its lower portion 50a to receive a screw driving chuck 51, the enlarged portion 50a of the bore 50 being non-circular or hexagonally shaped for driving engagement with the non-circular or hexagonally shaped outer surface of the chuck 51. The chuck 51 is removably retained within the end of the chuck carrier by the retaining cap nut 49.

The driving carrier 43 also has an enlarged bore portion 50b which extends rearwardly from the bore portion 50a. The bore portion 50b is circular but of slightly smaller diameter than the bore portion 50a, and it is adapted to receive an elongated guiding sleeve or stick-holding guide 55. The sleeve 55 serves to prevent too loose a fit of the screw stick in the axial bore of the driver and maintains the stick in more nearly axial alignment, particularly when smaller headed screws are being driven, for proper entry into the chuck 51. Because of its method of assembly, the sleeve 55 may be readily removed and replaced with a sleeve having a different size bore to accommodate a screwhead of a different size.

The sleeve 55 is provided adjacent its lower end with a radially projecting annular shoulder 55a which is hexagonal in shape and is drivingly engaged in the same hexagonal bore portion 50a so as to be driven thereby. The sleeve 55 engages the upper end of the bore portion 50a so as to prevent further axial movement of the sleeve 55 when in assembled position. The axial bore of the sleeve 55 is smooth and circular and it is provided with a flared mouth 55b at its upper end, the diameter of the bore being slightly larger than the head of the screw being driven. In assembling the parts of the driving section, the sleeve 55 is first slid rearwardly or upwardly into the bore 50b until its shoulder 55a engages the end of the bore 50b after which the chuck 51 may be inserted and pushed upwardly until its upper end bears against the lower side of the shoulder 55a. In this position, the lower end of the sleeve 55 extends downwardly within the smooth upper bore portion 81 of the chuck 51. Thereafter, the retaining cap nut 49 is attached so as to retain the parts in assembled condition.

The driving chuck 51, which will be described in detail hereinafter, is likewise provided with an axial bore comprising a lower circular portion 51a, an intermediate screw head engaging portion 52 and upper feed-in portions 81 and 82 down through which the screw stick passes during the feeding operation. The gear 13 also has an axial bore 53 at its rearward portion connecting with its larger axial bore 46, and this bore 53 is in alignment with axial bores 54 and 56 in the main supporting frame 10 and the rear cap member 14, respectively. As clearly shown in Fig. 1, the axial bores of the cap member 14, the main frame 10, the gear 13, the chuck carrier 43 and the chuck 51, sleeve 55 and the opening 46 for the spring 44 are in alignment so that the screw driver is thus provided with a continuous longitudinal bore from one end to the other which permits a long stick of screws to be inserted from the cap end thereof. Insertion of the screw stick is facilitated by a flared mouth 57 in the cap member 14. The aligned bores of the various parts, with the exception of the chuck 51, are of relatively large diameter so as to permit ready passage therethrough of screw sticks of a variety of sizes. The bore 52 of the chuck 51, however, which is non-circular or hexagonal, is of such size as to exactly fit the heads of the screws of the stick for proper driving engagement therewith, but because of the ease of assembly of the parts, the retaining cap nut 49 may be unscrewed and the chuck 51 replaced with another of similar construction but having a driving bore of different size to accommodate a screw head of a larger or smaller size. Likewise, when the chuck is replaced, the guiding sleeve 55 is also readily replaced with a sleeve having a larger or smaller bore depending on the size of the bore of the replacement chuck. Thus, the size of the axial openings of the other parts of the driver may remain in their constant enlarged size but the operable size of the longitudinal bore may be varied to accommodate different diameter screw sticks.

As shown in Figs. 1 and 3, the leading screw A of the screw stick, which is to be driven into a threaded opening of a piece of work, is held in projected position beyond the chuck 51 by the shank of the next screw B, the hexagonal head of which is in driving engagement within the hexagonal bore 52 of the chuck 51. It is thus apparent that the leading screw A is driven by the second screw B and when the screw A has become fully seated in tightened position in the work, continued rotation of the second screw B will cause its shank to be twisted off or sheared cleanly from the head of screw A. Thereafter, in a manner to be described in detail hereinafter, the screw B is projected beyond the screw engaging bore 52 of the chuck 51 and the screw C moves downwardly into position with the head thereof in driving engagement within the hexagonal bore 52 for the next driving operation.

The screw stick, when the screw A is pressed against the work, is restrained against movement inwardly of the chuck 51 by means of a relatively rigid thrust pawl 58 of strong construction. The pawl 58, as shown in Figs. 10 and 11, is non-circular or rectangular in cross section, and increases in size from its lower to its upper portion. As shown in Figs. 1, 2, 3 and 8, the pawl 58 is pivoted at its upper enlarged end on a cross pin 59 secured in the chuck carrier 43 adjacent the shoulder 43a and its lower portion extends downwardly and inwardly into engagement with the upper surface of the head of the driving screw B. The lower reduced end 43b of the chuck carrier 43 is provided along its entire extent with longitudinally extending and diametrically opposed slots 43c which are in alignment with longitudinally extending and diametrically opposed slots 60 in the chuck 51 and slots 55c and 55d in the sleeve 55, the slots 60, however, terminating at the top of the bore 52 at points removed from the lower end of the chuck 51. By reason of the aligned slotted construction of the reduced end of the carrier 43, the chuck 51 and the sleeve 55, the thrust pawl 58 and an advancing pawl 61 are permitted to extend downwardly and inwardly therethrough into engagement with the screw stick.

The thrust pawl 58 is constantly urged toward the axis of the tool into engagement with the screw stick by a spring 62. This spring encircles the pivot pin 59 on each side of the pawl 58 and extends downwardly and across and bears against the upper surface of the pawl, and its free ends bear against a transverse surface 63 of the chuck carrier. When the screw stick is fed downwardly so as to move the screw C into the position vacated by the screw B, the edge of the head of the screw C engages the thrust pawl 58 and rocks it in a clockwise direction away from the axis of the chuck, the spring 62 yielding to permit such movement. However, as soon as the head of the screw C passes beyond the end of the pawl 58, the pawl 58 snaps back in a counterclockwise direction into screw stick retaining position with its lower end engaging the upper surface of the screw head.

Because of its relatively rigid and rectangular construction and its separate, yieldable spring mounting so as to comprise a multi-piece construction, the thrust pawl 58 does not possess the disadvantages of the prior single piece, spring constructions and any tendency to become distorted and hence to misoperate, is eliminated. When the operator presses the screw A into engagement with the work which forces the chuck carrier 43 upwardly so as to cause driving engagement between the clutch teeth 42 and 41, the relatively great axial pressure will not distort or bend the thrust pawl 58 since its rigid and strong construction is sufficient to withstand such pressure. Yet, at the same time, the pawl 58 is readily yieldable to permit feeding movement of the screw stick. Thus, the present thrust pawl construction is not subject to frequent misoperation, repair and replacement as is common with the single piece, circular spring construction which often becomes broken or distorted because of back pressure and consequently fails to maintain the screw stick in proper advanced position.

Feeding movement of the screw stick through the driver is accomplished by means of the advance pawl 61 which, as shown in Figs. 1 and 3, is mounted within and carried by the chuck carrier 43 and is adapted for movement axially thereof. The lower free end of the advancing pawl 61 is adapted to engage the upper surfaces of the screw heads and its upper end is secured to a threaded plug 64 which is received within the threaded bore in the lower end of a pawl holder 66. The pawl holder 66 is mounted for slidable movement in a direction parallel to the axis of the driver in a short bore 67 in the lower end of the larger portion of the chuck carrier 43 and in a longer bore 68 in the upper portion thereof, the bores 67 and 68 being in alignment and parallel to the axis of the driver. The chuck carrier 43 is cut away diametrically from one side to the other between the bores 67 and 68 to provide a transverse recess 69 so that the pawl holder 66 is slidable through the recess with its respective end portions supported at all times in the axial bores 67 and 68. The upper end of the pawl holder 66 extends only partially up within the carrier bore 68 and the remainder thereof is occupied by a compression spring 70 confined between the upper end of the pawl holder 66 and the end of the bore 68. The spring 70 serves to urge the pawl holder 66 and the advance pawl 61 downwardly into engagement with the screw stick at all times but during the feeding operation permits those parts to be moved upwardly in a manner as will now be described.

A portion of the advance pawl holder 66 that extends through the carrier recess 69 is cut away to provide a neck portion 71 of reduced diameter. As shown clearly in Figs. 1, 2, 3 and 5 of the drawings, the neck portion 71 is received between the bifurcated ends 72 of a lever 73 that is pivoted intermediate its ends within the recess 69 on pins or dog points 74. The pivot pins 74 are integrally formed with and project inwardly into the recess from socket screws 76 secured in the walls of the chuck carrier 43 diametrically opposite each other, the socket screws 76 and pins 74 being retained in properly adjusted position by means of set screws 77. The bifurcated end 72 of the lever 73 remains in constant engagement with the pawl holder 66 so that when the lever is rocked during feeding movement in a counterclockwise direction from its Fig. 1 to its Fig. 3 position, the pawl holder will be forced upwardly so as to compress the spring 70 and to move or retract the advance pawl 61 upwardly.

Counterclockwise movement of the lever 73 is effected by means of a thrust pin 78 slidably mounted for axial movement in a bore 79 in the chuck carrier 43 which extends in a substantially axial direction parallel to the central bore 50 of the carrier, the bore 79 being disposed on the other side of the central bore 50 opposite the pawl holder bore 68. The thrust pin 78 is elongated and is of greater length than the bore 79 so as to project at its lower or forward end into the transverse chuck carrier recess 69 into engagement with the end of the lever 73 and at its upper or rearward end into the space between the chuck carrier 43 and the gear 13, as shown in Fig. 1. The upper end of the thrust pin 78 is adapted to be engaged by the lower end face of the gear 13 when the chuck carrier 43 is moved upwardly relative to the cylindrical housing 17 upon engagement of the screw stick with the work and it is held thereby against further upward axial movement along with the carrier 43. As the carrier 43 continues to slide upwardly, the lower end of the thrust pin 78 is caused to project to a greater extent into the transverse recess 69 and consequently forces the lever 73 to turn about its pivots 74 in a counterclockwise direction to its Fig. 3 position and hence effect upward movement of the pawl holder 66 and the advance pawl 61.

The lever 73, as shown in Fig. 5, is provided at its central portion with an oval slot 80 which is of substantially the same width as the diameter of the central, axial bores of the various parts through which the screw stick freely passes and is in alignment therewith. The slot 80 is also of sufficient length as to provide full and unobstructed passage for the screw stick when the lever 72 is in its normal Fig. 1 position wherein it is inclined to the axis of the tool.

In the operation of the screw stick driver described in detail above, the operator first inserts a screw stick through the rear cap opening 57 down the central bore of the driver formed by the various aligned parts. This stick may comprise more than thirty complete screws and when in initial fully inserted position may still project outwardly from the rear cap member 14. The stick of screws is pushed down by the operator until the screw A extends outwardly beyond the lower end of the chuck 51 and the screw B has its hexagonal head in engagement with the hexagonal bore 52 of the chuck. As the screws A and B pass downwardly, they engage the thrust pawl 58 and the advance pawl 61 but since these parts are yieldable, the screws may freely pass on down between them. When the screws A and B are in their initial position, the thrust pawl 58 and the advance pawl 61 are each in engagement with the upper surface of the second screw B, as shown in Fig. 1, and the screw stick driver is ready for use.

The operator then may bring the portable power driver to the work and press the screw A into contact within a threaded opening thereof. Upon the exertion of sufficient axial pressure, the chuck carrier 43 slides relatively upwardly within the cylindrical housing 17 until the clutch teeth 42 of the chuck carrier 43 are in driving engagement with the clutch teeth 41 of the driving gear 13 as shown in Fig. 3. When the teeth 41 and 42 have been clutched, the operator may then depress the lever 29 to operate the air motor 11 and drive the screw A although the motor 11 may also be set in operation prior to engagement of the clutch teeth. As the carrier 43 is rotated, all of the parts secured to and carried by it, such as the chuck 51, the advancing pawl 61 and its mechanism, the thrust pawl, and the retaining cap nut 49, rotate with it as a unit.

At the same time that the clutch teeth 41 and 42 are being moved relatively into driving engagement, the advance pawl 61 is being retracted upwardly by means of the thrust pin 78, lever 73 and pawl holder 66, until the lower or forward end of the advance pawl 61 snaps into place against the upper surface of the screw C, as shown clearly in Fig. 3. The parts just described remain in their relative positions shown in Fig. 3 during the driving operations until the screw A has been driven home and has been twisted off from the end of the shank of screw B. As soon as the driving operation as to screw A has been completed, the operator may then remove the driver from the work so as to relieve the relative axial pressure therebetween. When such pressure is relieved, the spring 44 restores the chuck carrier 43 to its Fig. 1 position at the forward end of the housing 17, thereby separating the clutch teeth 41 and 42, and simultaneously the advance pawl 61 is moved downwardly under the urge of spring 79, forcing the screw C into the hexagonal bore 52 of the chuck 51 and projecting the screw B beyond the lower end of the chuck in position for application to another threaded opening in the work. The entire stick of screws may thus be fed step by step into and through the chuck as the screws thereof are applied one by one to the work, the advance pawl 61 being moved upwardly to engage the third screw C during the clutching movement and being moved downwardly to feed the screw stick during the declutching movement.

The feeding movement of the screw stick into and through the chuck 51 is greatly facilitated by the novel construction of the feed-in portion of the chuck as shown in enlarged detail in Figs. 6 and 7 of the drawings. By such improved construction all tendency of the normally twisted stick of screws, as shown in Fig. 9 of the drawing, to stick or bind in the chuck or to feed improperly therethrough because of the inherent misalignment of the screw heads is entirely eliminated, thus permitting rapid and uninterrupted operation of the tool. The hexagonal bore 52 of the chuck 51 is the same size along its entire extent and is in axial alignment with the bores of the other parts of the driver thereabove. At its upper or entry end the chuck 51 is provided with an enlarged, conical bore 81 which has smooth surfaces and tapers inwardly somewhat toward the central portion of the chuck. The tapered bore 81 is connected to the straight hexagonal bore 52 by a tapered feed-in portion or guideway 82 which serves to guide and adjust the misaligned hexagonal screw heads of the succeeding screws into proper position for ready and free entry into the straight hexagonal bore 52. By means of the stick-adjusting guideway 82, the vertical side faces of each of the screw heads are brought or rotated into alignment with the respective faces of the straight hexagonal bore 52 so that the individual screw heads may readily enter and pass freely therethrough during feeding movement as above described.

The stick-adjusting guideway 82 is generally conical in shape and is provided with a plurality of inwardly tapering lead-in planes or faces 83 and 84. At its upper end the guide-way 82 is star-shaped and it then tapers downwardly and inwardly in a plurality of faces until its lower end terminates in a hexagonal configuration alignment with the hexagonal bore 52 of the chuck 51. There are two lead-in surfaces 83 for each face or apex of the hexagonal bore 52 so that the guideway 82 is provided with eighteen lead-in surfaces in eighteen different planes. As shown in Figs. 6 and 7, each of the lead-in faces 83 and 84 tapers inwardly and downwardly toward the bore 52, and adjacent pairs of lead-in faces 83 are angularly disposed toward each other and slant both radially and tangentially so as to form a plurality of guiding troughs separating the tapering faces 84. The line bottoms of the troughs, indicated by the numeral 86, also slope inwardly and downwardly from the smooth bore 81 and terminate in alignment with the apices of the hexagonal bore 52.

In the event the head of the screw C is twisted out of alignment with the head of screw B, and the screw C is being fed into the straight hexagonal bore 52 of the chuck 51, the vertical side faces of the head of screw C will engage certain of the tapering faces 83 of the guideway 82, and as the screw C continues its downward movement under the urge of the advancing pawl 61, it will be rotated slightly until the vertical side faces of the screw head are in substantialy alignment with the flat faces of the hexagonal bore 52. When this alignment is achieved, the screw C may thus readily enter into the restricted hexagonal bore 52 without undue friction or sticking. Rotation of the screw C will, of course, cause rotation of the entire stick of screws but because of the nature of the engagement the screw stick with the thrust pawl 58 and the advancing pawl 61 and the loose fit of the stick in the central bore of the driver, such rotation is not hampered in any way.

It is thus apparent that the tapering faces 83 are in effect torque-applying, cam surfaces by which rotational feeding adjustment of a screw is accomplished, and the number and shape of these cam surfaces may be varied depending upon the particular non-circular shape of the screw head and of the driving bore of the chuck. For example, where the heads of the screws are square and the driving bore of the chuck is likewise square, the lead-in portion 82 may be formed with eight tapering faces 83 forming four trough-like configurations. In like manner, the lead-in portion 82 may be adapted to serve other configurations. It is also to be noted that the number of lead-in or cam faces 83 may likewise be reduced in number, for as long as there is present in the lead-in portion 82 at least one cam face which will be engaged by a screw head as it passes downwardly therethrough, the entire screw head will be effectively rotated into proper adjustment.

It is to be noted further that the hexagonal bore 52 and the guideway 82 of the chuck 51 are of such relative lengths that only one screw is in the hexagonal bore 52 in driving engagement with the chuck 51 at any one time. Also, the length of hexagonal bore 52 relative to the length of the screws is such that before the head of screw C enters the hexagonal bore 52, the head of screw B has already passed from that bore. This permits the screw C to be turned or adjusted readily in the guideway 82 into proper alignment with the bore 52 without any resistance to rotation. It is apparent that if the head of screw B were permitted to remain in engagement in the bore 52 throughout the entire time when the screw C was passing through the guideway 82, rotational adjustment and alignment would be retarded if not prevented altogether. It is further apparent that if two screw heads were permitted to be in the hexagonal bore 52 at any one time, the relative torsional twist therebetween would also tend to cause the side faces of the screw heads to bind against the flat faces of the bore, thus preventing free feeding movement of the screws through the bore.

In Figs. 11 and 12 of the drawings, there is illustrated a modified form of chuck and driving section which differs from the embodiment of Figs. 1 to 10, inclusive, in that the chuck is rotatably adjustable relative to the screw stick and relative to the driving chuck carrier rather than being of stationary construction. In this form, the driving cylinder 100 is provided with an enlarged hexagonal bore 101 into which is received a chuck 102. The outer periphery of the chuck 102 is likewise hexagonal in shape but is smaller in outside dimensions than the bore 101 so as to have a loose fit therein and be capable of limited rotative movement relative to the rotatable carrier 100. However, the distance from the apices on the hexagonal periphery of the chuck 102 to the axis thereof still is greater than the radial distances between the faces of the hexagonal bore 101 and the axis, so that chuck 102 must be engaged and driven by the cylinder 100 after slight relative rotation therebetween. The chuck 102 is provided with an axial opening extending therethrough which comprises a smooth circular bore 103 at its lower end, a hexagonal bore 104 at its intermediate portion for driving engagement with a screw head, and a smooth tapering conical bore 106 at its upper end serving as a feed or stick receiving portion.

The chuck 102 is retained in axial position in the hexagonal bore 101 of the driving cylinder 100 by means of a snap ring 107 secured in complemental, aligned, annular recesses in the outer surface of the chuck 102 and in the bore 101. Unlike the first embodiment, the cap member 108, which is threadedly engaged on the lower end of the driving cylinder 100, merely serves as a housing member and does not retain the chuck 102 in axial position in the bore 101, this function being performed by the snap ring 107. The chuck 102 is also provided with two diametrically opposite longitudinal slots 109 adapted to remain in substantial alignment with diametrically opposed longitudinal slots 110 formed in the lower portion of the driving cylinder 100, these slots being adapted to receive the advancing pawl 111 and the thrust pawl 112. As shown in Fig. 12, the widths of the chuck slots 109 are considerably greater than the thickness of the pawls 111 and 112 so as to permit limited rotational movement of the chuck 102 relative thereto.

As shown clearly in Fig. 13 of the drawings, the screwheads of each of the individual screws are provided, in accordance with their normal methods of manufacture, with slightly curved and upwardly tapering faces 120 on their under sides adjacent their apices, and these, in effect, are minute cam faces against which the chuck 102 is caused to rotatably slide as the screw stick is advanced under pressure. Although these faces 120 are relatively small, they are of sufficient size to rotate the chuck 102 into proper alignment, since the extent of misalignment between adjacent screwheads is usually relatively small.

The operation of this modified form of chuck and driving section is quite similar to that of the first embodiment in that the screw stick and the chuck 102, upon the advancement of the screw stick by the advancing pawl 111 when the driving cylinder 100 is declutched, are caused to move or rotate relative to each other until the hexagonal bore portion 104 of the chuck is in alignment with the next successive screwhead. If, when the pawl 111 pushes down on the screw stick, the proper alignment does not exist between the next screwhead and the hexagonal bore portion 104, the chuck 102 will be caused to rotate slightly relative to the driving cylinder 100 and relative to the screwhead by engagement of the cam faces 120 of the screwheads with the lower end of the bore portion 106, until proper alignment is established. The extent of relative rotation between the chuck 102 and the driving cylinder 100 is governed by the extent of clearance between those parts. A clearance permitting relative rotation to an extent of approximately 8 degrees to one side or the other is quite satisfactory. It is to be understood, however, that before rotational adjustment of the chuck 102 occurs, the head of the preceding screw has already passed out of driving engagement with the hexagonal bore portion 104 so that no binding will occur.

When the chuck 102 has been properly aligned with the next screwhead and that screw has passed downwardly into engagement in the bore portion 104, the driver is then in condition for driving another screw. When the cylinder 100 is moved to clutched position and is then rotated, it will move independently only a very limited extent until it drivingly engages the chuck 102, and thereafter the cylinder and the chuck will rotate as a unit as in the first embodiment. The relative position of the chuck 102 in the bore portion 101 of the driving cylinder is clearly shown in Fig. 12 with the parts in driving engagement.

In Fig. 14 and 15 of the drawings, there is illustrated a third form of adjusting means by which the normally twisted screw stick may be rotated so as to align a screwhead for ready entry into the driving chuck portion of the screw driving assembly. In this form the screw stick is frictionally engaged by the adjusting means and is positively rotated into aligned position as the screw stick is advanced under pressure. The general over-all construction of the screw stick driver to which this third form is applied, is similar to that shown in Figs. 1 to 10 of the drawings.

This third form of screw stick adjusting means comprises an elongated tube 130 having an inner axial bore 130a of uniform inside diameter throughout its entire length through which a screw stick may pass and a stepped exterior configuration providing portions 130b, 130c, and 130d of small, intermediate and large outside diameters, respectively. The tube 130 extends downwardly through the enlarged axial bore 131 of the driving gear 132, through the upper axial bore 133 of the rotatable chuck carrier 134, through the oval slot 136 of the advancing lever 137 and through the lower axial bore 138 of the carrier 134. The enlarged rearward portion 130d of the tube 130 fits tightly in the bore 131 of the driving gear 132 so that the tube and gear rotate together at all times. However, the intermediate tube portion 130c is slightly spaced from the walls of the chuck carrier bore 133 and the small tube portion 130b is slightly spaced from the walls of the lower chuck carrier bore 138 and the lever 137 for free and independent rotative movement relative thereto.

The lower end of the tube 130 is bifurcated thus forming two diametrically opposed fingers 139 which are spring tempered and have their side edge portions curved outwardly away from the axis of the tube in a direction opposite to the curvature of the tube portion 130b, as shown in Fig. 15. The distance between the inner portions of the curved fingers 139 is slightly greater than the distance between the opposed flat edges of the screwheads but is slightly less than the distance between the opposed apices of the screwheads, so that upon rotation of the tube 130 the fingers 139 will frictionally engage a screwhead adjacent its apices and rotate the screw stick with a wiping action. The space between the fingers 139 is free and unobstructed and because of their resilient nature and the clearances above described, the screw stick may be readily advanced therethrough under the urge of the advancing pawl 140.

As in the first embodiment, a chuck 141 is secured in the forward end of the chuck carrier 134 against relative rotative movement, although for the purposes of this embodiment the chuck portion may be formed integrally therein. The chuck 141 is provided with an axial bore extending therethrough, this bore comprising an hexagonal screwhead-engaging portion 142 at its forward end and an enlarged, slightly tapered lead-in portion 143 at its rearward end at the extreme upper end of which there is a flared mouth 144. The rearward portion of this chuck 141 is also provided with diametrically opposed slots 146 through which the advancing pawl 140 and the thrust pawl 147 may project into engagement with the screw stick. When the parts are in normal non-driving position, the lower ends of the fingers 139 are spaced a considerable distance upwardly or rearwardly from the lead-in portion 143 of the chuck 141, this space being slightly greater than the distance between the top surfaces of the clutch teeth 148 and 149 and the upper surfaces of the chuck carrier 134 and the driving gear 132, respectively. As a result of this relative spacing, the fingers 139 will still be spaced a slight distance from the chuck lead-in portion 143 when the carrier 134 and the driving gear 132 are moved into clutched driving engagement. It is to be further noted that the fingers 139 terminate a sufficient distance above the thrust pawl 147 and the advancing pawl 140 and hence in no way interfere with their operation. In this form, the slidable carrier 134 is urged into declutched position only by the spring 150 of the advancing pawl mechanism comprising the pawl holder 151, the lever 137 and the slidable pin 152 which engages the under side of the gear clutch 132. The spring 44 of the first embodiment is thus eliminated.

Thus, when the screw A is placed in a threaded opening of a piece of work and pressure is applied, the chuck carrier 134 will slide relatively upwardly so as to engage the clutch teeth 148 with the clutch teeth 149 and hence it will be rotated as described above. As the screw A is being driven the tube 130 is rotating with the driving gear 132 and the fingers 139 are rotating in frictional engagement with the screw E of the screw stick which itself is also being rotated by the chuck 141 and the carrier 134. As in the first embodiment, the advancing pawl 140 is retracted to the position against the upper surface of the screw C when the parts are moved to clutched position.

After the screw A has been driven home and twisted off from screw B and the pressure against the work is relieved so as to declutch the carrier 134 and the gear 132, the advancing pawl 140 moves downwardly and forces the screw B out beyond the chuck 141 and forces the screw C into the driving bore 142 of the chuck. However, in the event the head of screw C is out of alignment with the head of screw B, it is necessary that the screw C be rotated slightly until the apices of its head are in alignment with the apices of the hexagonal chuck bore 142. This is accomplished by the tube 130 and its gripping fingers 139 which continue to rotate after the clutch teeth 148 and 149 have broken off engagement and which are always in driving engagement with the driving gear 132. The fingers 139 engage the head of screw E and place a driving torque thereon and this driving torque continues while the screw E is being pulled downwardly between the fingers 139.

When the screw C reaches the lower end of the chuck lead-in portion 143 its further forward movement into the chuck bore 142 is prevented because of the misalignment. However, the screw stick continues to rotate due to continued rotation of the tube 130 and the fingers 139 until the apices of the screwhead C and the apices of the chuck bore 142 are in alignment, at which time, under the pressure of the advancing pawl 140 which is continuously exerted during rotation of the screw stick, the head of screw C slides forwardly into the bore 142. As the screw C slides into position, the screw E is forced out between the lower ends of the fingers 139 and the next succeeding screw becomes frictionally engaged therebetween for the next operation.

It is thus apparent that the relative rotational adjustment between the screw stick and the driving portion of the chuck is accomplished in the third embodiment of the present invention by a positive rotating adjustment means whereby the screw stick is rotated under forward pressure until alignment is achieved. The use of tapering cam faces is eliminated and the chuck construction of the driving assembly may be formed without the special tapering lead-in faces of the first form or the rotatably mounted chuck of the second embodiment.

Although there has been described above and shown in the drawings a screw stick driver comprising a preferred embodiment of the present invention and including three forms of screw stick aligning or adjusting means, it is apparent that changes and modifications in the details of structure and mode of operation may be made without departing from the spirit and scope of the appended claims.

I claim:

1. In a screw driver adapted to drive into work the successive screws of a screw stick having non-circular heads, a screw driving section comprising a non-circular portion adapted to grip the screwhead of the second screw of the stick next following the leading screw to drive the leading screw into said work and a feed portion for adjusting and directing the screwhead of said second screw, upon advancement thereof, into proper alignment with said gripping portion for ready entry therein, said feed portion having a non-circular surface in alignment at its discharge end with the gripping portion and including a torque-applying, tapering cam surface for effecting rotative movement of the screwhead of said second screw into proper alignment with said gripping portion.

2. In a screw driver adapted to drive into work the successive screws of a screw stick having non-circular heads, a screw driving section comprising a non-circular portion adapted to grip the screw head of the second screw of the stick next following the leading screw to drive the leading screw into said work and a feed portion for adjusting and directing the screwhead of said second screw, upon advancement thereof, into proper alignment with said gripping portion for ready entry therein, said feed portion having a non-circular surface in alignment at its reduced discharge end with the gripping portion and including an axially directed surface slanting both radially and tangentially and adapted to be engaged by the screwhead of said second screw.

3. In a screw driver adapted to drive into work the successive screws of a screw stick having non-circular heads, a screw driving section comprising a non-circular portion adapted to grip the screwhead of the second screw of the stick next following the leading screw to drive the leading screw into said work and a feed portion for adjusting and directing the screwhead of said second screw, upon advancement thereof, into proper alignment with said gripping portion for ready entry therein, said feed portion having a non-circular surface connecting at its discharge end with the gripping portion and including a plurality of inclined guide-in surfaces disposed angularly with respect to each other and tapering upwardly and outwardly toward the receiving end thereof and adapted to engage and rotate the screwhead of said second screw.

4. In a screw driver adapted to drive into work the successive screws of a screw stick having non-circular heads, a screw driving section comprising a non-circular portion adapted to grip the screwhead of the second screw of the stick next following the leading screw to drive the leading screw into said work and a feed portion for adjusting and directing the screwhead of said second screw, upon advancement thereof, into proper alignment with said gripping portion for ready entry therein, said feed portion having a non-circular surface connecting at its discharge end with the gripping portion and including a torque-applying, tapering cam surface for effecting rotative movement of the screwhead of said second screw into proper alignment with said gripping portion and said gripping portion being of such length as to engage one screwhead at a time and to permit screwhead of the leading screw, upon advancement thereof, to pass out of engagement therewith before the head of said second screw enters said gripping portion.

5. In a screw driver adapted to drive into work the successive screws of a screw stick having non-circular heads, the combination of a rotatable driving member, a screw driving chuck engageable with and driven by said driving member and having a non-circular portion adapted to grip the screw head of the second screw of the stick next following the leading screw to drive the leading screw into said work, and means for effecting relative rotational movement between the chuck and the head of said second screw upon advancement of the screw stick to effect proper alignment of a non-circular screw head of said second screw with said non-circular portion of the chuck for ready entry of the screw head of said second screw therein.

6. In a screw driver adapted to drive into work the successive screws of a screw stick having non-circular, cam-faced heads, the combination of a rotatable driving member, a screw driving chuck carried by said driving member for limited rotational movement relative thereto and adapted to be driven by said driving member, said chuck having a non-circular portion adapted to grip the screwhead of the second screw of the stick next following the leading screw to drive the leading screw into said work and having a tapered feed portion engageable with a cam face of a screw head and said chuck being thereby adapted to be rotated to a limited extent relative to the driving member and to the head of said second screw upon advancement thereof by engagement of the feed portion with a cam face of said screwhead, for aligning itself with respect to said screwhead for proper entry thereof into its non-circular portion.

7. In a screw driver adapted to drive into work the successive screws of a screw stick having non-circular heads, the combination of a rotatable driving member having a non-circular axial opening therein providing a driving bearing portion, a screw driving chuck secured in said opening against relative axial movement and having an outer non-circular, peripheral configuration with a peripheral bearing portion engageable with said driving bearing portion upon relative rotation between said chuck and driving member to permit limited rotational movement of said chuck in said non-circular opening relative to said driving member and to effect driving engagement therebetween upon continued rotation of said driving member, said chuck having a non-circular portion adapted to grip a screwhead to drive the same and having a tapered feed portion engageable with a screw head and said chuck being thereby adapted to be rotated to a limited extent relative to the driving member and to the screw stick by engagement of the screw head with the feed portion upon advancement thereof, for aligning itself with respect to a screwhead for proper entry thereof into its non-circular portion.

8. In a screw driver adapted to drive into work the successive screws of a screw stick having non-circular heads, the combination of a rotatable driving member having a non-circular axial opening therein providing a driving bearing portion, a screw driving chuck secured in said opening against relative axial movement and having an outer periphery of non-circular configuration with a peripheral bearing portion engageable with said driving bearing portion upon relative rotation between said chuck and driving member whereby limited rotational movement of said chuck in said non-circular opening relative to said driving member is permitted and driving engagement therebetween upon continued rotation of said driving member is effected, and retaining means for preventing relative axial movement between said chuck and said driving member but permitting limited rotational movement therebetween.

9. In a screw driver adapted to drive into work the successive screws of a screw stick having non-circular heads, the combination of a rotatable screw driving assembly having the non-circular portion adapted to grip a screwhead of the second screw of the stick next following the leading screw to drive the leading screw into said work and an axial opening to permit the insertion and advancement of a stick of screws therethrough, pressure means for advancing the stick of screws, and adjusting means for rotating the head of said second screw of the screw stick upon advancement thereof to effect proper alignment of the non-circular screwhead of said second screw with said non-circular portion of the driving assembly for ready entry of the screwhead therein, said advancing means and said adjusting means being adapted to effect rotation of the screwhead of said second screw under pressure against the entry to said non-circular portion until alignment is achieved.

10. In a screw driver adapted to drive into work the successive screws of a screw stick having non-circular heads, a rotatable driving element, a rotatable screw driving assembly adapted to be operably engaged with and disengaged from said driving element and having a non-circular portion adapted to grip a screwhead to drive the same and an axial opening to permit the insertion and advancement of a stick of screws therethrough, and adjusting means for rotating the screw stick to effect proper alignment of a non-circular screwhead with said non-circular portion of the screw driving assembly for ready entry of the screwhead therein, said adjusting means comprising a rotatable member operably connected with said rotatable driving element for rotation therewith and adapted to engage a screw stick for rotation thereof and to permit advancing axial movement thereof.

11. In a screw driver adapted to drive into work the successive screws of a screw stick having non-circular heads, a rotatable driving element, a rotatable screw driving assembly slidably mounted for axial movement to and from driving engagement with said driving element and having a non-circular portion adapted to grip a screwhead to drive the same and an axial opening to permit the insertion and advancement of a stick of screws therethrough, and adjusting means for rotating the screw stick to effect proper alignment of a non-circular screwhead with said non-circular portion of the screw driving assembly for ready entry of the screwhead therein, said adjusting means comprising an elongated rotatable member operably engaged with said rotatable driving element for rotation therewith and extending downwardly through said axial opening of the screw driving assembly adjacent the non-circular portion thereof and gripping means on the end portion of said elongated member adapted to engage a screw stick for rotation thereof and to permit advancing axial movement thereof.

12. In a screw driver adapted to drive into work the successive screws of a screw stick having non-circular heads, a rotatable driving element, a rotatable screw driving assembly slidably mounted for axial movement to and from driving engagement with said driving element and having a non-circular portion adapted to grip a screwhead to drive the same and an axial opening to permit the insertion and advancement of a stick of screws therethrough, and adjusting means for rotating the screw stick to effect proper alignment of a non-circular screwhead with said non-circular portion of the screw driving assembly for ready entry of the screwhead therein, said adjusting means comprising an elongated rotatable member operably engaged with said rotatable driving element for rotation therewith and extending downwardly through said axial opening of the screw driving assembly adjacent the non-circular portion thereof and gripping means on the end portion of said elongated member adapted to engage a screw stick for rotation thereof and to permit advancing axial movement thereof, said gripping means, when in non-driving position, being spaced above said non-circular portion a distance greater than the distance required to effect driving engagement between said screw driving assembly and said driving element.

13. In a screw driver adapted to drive into work the successive screws of a screw stick having non-circular heads, a rotatable driving element, a rotatable screw driving assembly slidably mounted for axial movement to and from driving engagement with said driving element and having a non-circular portion adapted to grip a screwhead to drive the same and an axial opening to permit the insertion and advancement of a stick of screws therethrough, pressure means for advancing the stick of screws when said screw driving assembly is moved out of driving engagement with said driving element, and adjusting means for rotating the screw stick, upon advancement thereof, to effect proper alignment of a non-circular screwhead with said non-circular portion of the screw driving assembly for ready entry of the screwhead therein, said adjusting means comprising a rotatable tubular member operably engaged with said driving element for rotation therewith and extending downwardly through the axial opening of the screw driving assembly adjacent the non-circular portion thereof and spaced gripping elements projecting downwardly from the end of said tubular member and adapted to frictionally engage a screw stick for rotation thereof, and said tubular member and said gripping elements being adapted to receive said screw stick and to permit advancing movement therethrough.

14. In a screw driver adapted to drive into work the successive screws of a screw stick having non-circular heads, a rotatable driving element, a rotatable screw driving assembly slidably mounted for axial movement to and from driving engagement with said driving element and having a non-circular portion adapted to grip a screwhead to drive the same and an axial opening to permit the insertion and advancement of a stick of screws therethrough, and adjusting means for rotating the screw stick to effect proper alignment of a non-circular screwhead with said non-circular portion of the screw driving assembly for ready entry of the screwhead therein, said adjusting means comprising an elongated rotatable member operably engaged with said rotatable driving element for rotation therewith and extending downwardly through said axial opening of the screw driving assembly adjacent the non-circular portion thereof and spaced finger elements projecting downwardly from the end of said elongated member and adapted to engage the head of a screw stick for rotation thereof and to permit advancing axial movement therethrough, the side portions of said finger elements being transversely curved away from the axis of the elongated member and the space between said elements being less than the greatest diameter of the screwhead.

15. In a screw driver adapted to drive into work the successive screws of a screw stick and having a driving assembly including a screw driving section adapted to engage and drive a screwhead, a screw advancing member, a screw holding mechanism adapted to engage and restrain a screw against rearward movement and comprising a thrust pawl pivotally mounted for movement toward and away from the axial path of advancing movement of said said screws and a resilient member constantly urging said pawl into holding engagement with a screw and adapted to permit movement of said pawl away from said axial path to release said screw for advancing movement.

16. In a screw driver adapted to drive into work the successive screws of a screw stick and having a driving assembly including a screw driving section adapted to engage and drive a screwhead and a screw advancing member, a screw holding mechanism adapted to engage and restrain a screw against rearward movement in the driving assembly and comprising a polygonal, relatively rigid thrust pawl movably mounted with respect to the driving assembly for movement toward and away from the axial path of advancing movement of said screws and a resilient member constantly urging said pawl into engagement with a screw and adapted to permit movement of said pawl away from said axial path to release said screw for advancing movement.

17. In a screw driver adapted to drive into work the successive screws of a screw stick and having a driving section adapted to engage and drive a screwhead, a screw advancing pawl adapted to engage and advance successive screws through the driving section and a thrust pawl adapted to engage and restrain a screw against rearward movement in said driving section, at least one of said pawls being polygonal in cross section.

18. In a screw driver adapted to drive into the work the successive screws of a screw stick comprising a rotary motor, a rotatable clutch member operably connected to said motor, a rotatable screw driving assembly including a screw driving chuck at its forward end and a clutch element at its rearward end in spaced relation from said rotatable clutch member when in inoperative position, said screw driving assembly being slidably mounted for axial movement to and from clutched position, a screw advancing mechanism carried by said driving assembly and comprising a slidable screw engaging member and means for retracting said screw engaging member relative to said screw stick into engagement with the next successive screw thereof upon movement of the driving assembly to clutched position and for advancing said screw stick when the driving assembly is moved to declutched position.

19. A screw driver adapted to drive into work the successive screws of a screw stick and having a longitudinal bore through which the screw stick may pass, said driver comprising a rotary motor, a rotatable clutch member operably connected with the motor and a rotatable screw driving assembly comprising a rotatable cage having a chuck receiving portion at its lower end and a clutch element at its upper end in spaced relation from said clutch member, said cage being slidably mounted for relative axial movement to and from clutched engagement with said clutch member, a screw holding pawl carried by the cage and movable in a radial direction into the path of movement of a screw stick for engagement therewith, a screw advancing pawl slidably carried by the cage and reciprocably movable in an axial direction for engaging a successive screw and advancing the same when the cage is moved to clutched and declutched positions, respectively and means for effecting said axial movement of said pawl upon said movement of said cage.

20. A screw driver adapted to drive into work the successive screws of a screw stick comprising a rotary motor, a rotatable clutch member operably connected to said motor, a rotatable screw driving assembly including a screw driving chuck at its forward end and a clutch element at its rearward end in spaced relation from said rotatable clutch member when in inoperative position, yieldable means for maintaining said driving assembly and said rotatable clutch element in declutched position, said screw driving assembly being slidably mounted for relative axial movement to and from clutched position and said rotatable clutch member, screw driving assembly and chuck having aligned axial openings extending therethrough to permit the insertion and advancement of a stick of screws therethrough, a screw holder adapted to engage and restrain a screw against rearward movement in the driver and a screw advancing mechanism carried by said driving assembly and comprising a slidable screw engaging member adapted to be retracted relative to said screw stick into engagement with the next successive screw thereof upon relative movement of the driving assembly to clutched position and to advance said screw stick when the driving assembly is moved to declutched position.

21. A screw driver adapted to drive into work the successive screws of a screw stick and having an axial bore through which the screw stick may pass, said driver comprising a rotary motor, a rotatable clutch member operably connected with the motor, a rotatable screw driving assembly including a screw driving chuck at its forward end and a clutch element at its rearward end in spaced relation from said rotatable clutch member when in inoperative declutched position, said driving assembly being slidably mounted for relative axial movement to and from clutched engagement with said clutch member, and a screw advancing mechanism carried by said driving assembly and comprising a retractible screw engaging pawl adapted to advance the screw stick when the driving assembly is moved to declutched position and pawl actuating means mounted for relative slidable movement longitudinally of said assembly and adapted to engage the rotatable clutch member upon movement to clutched position for retracting said pawl to engage the next successive screw.

22. A screw driver adapted to drive into work the successive screws of a screw stick and having an axial bore through which the screw stick may pass, said driver comprising a housing, a rotary motor, a rotatable clutch member operably connected with the motor, a rotatable screw driving assembly at the front of said housing including a screw driving chuck at its forward end and a clutch element at its rearward end in spaced relation from said rotatable clutch member when in inoperative declutched position, said driving assembly being slidably mounted for relative axial movement to and from clutched engagement with said clutch member, and a screw advancing mechanism carried by said driving assembly, and comprising a retractible screw engaging pawl, a slidable holder for said pawl, an actuating rod mounted for relative slidable movement longitudinally of said assembly and having one of its ends extending into the space between said assembly and the clutch member, a lever pivotally mounted in said assembly and operably engaged with the other end of said actuating rod and with the slidable pawl holder and resilient means for urging the pawl to forward position.

23. A screw driver adapted to drive into work the successive screws of a screw stick and comprising a housing; a rotary motor; a rotatable clutch member operably connected with the motor; a rotatable chuck carrier at the front of said housing having an axial bore extending therethrough, a recess extending transversely thereof and intersecting said axial bore, a clutch element on the rearward end thereof in spaced relation from the clutch member when in inoperative position and spaced longitudinal side bores disposed on opposite sides of the axial bore and connecting with said recess, one of said bores being longer and extending through to the rearward end of said carrier; a driving chuck carried at the lower end of said rotatable carrier; and a screw advancing mechanism carried by said carrier and comprising a retractible screw-engaging pawl, a slidable holder for said pawl mounted in the shorter side bore, an actuating rod mounted for relative slidable movement in said longer side bore and having its respective ends projecting into said transverse recess and the space between said carrier and said clutch member, and a lever pivotally mounted in the transverse recess of the carrier and operably engaged with the lower end of said actuating rod and with the slidable pawl holder.

24. A screw driver adapted to drive into work the successive screws of a screw stick and comprising a housing; a rotary motor; a rotatable clutch member operably connected with the motor; a rotatable chuck carrier at the front of said housing having an axial bore extending therethrough, a recess extending transversely thereof and intersecting said axial bore, a clutch element on the rearward end thereof in spaced relation from the clutch member when in inoperative position and spaced longitudinal side bores disposed on opposite sides of the axial bore and connecting with said recess, one of said bores being longer and extending through to the rearward end of said carrier; a driving chuck carried at the lower end of said rotatable carrier; a screw advancing mechanism carried by said carrier and comprising a retractible screw-engaging pawl, a slidable holder for said pawl mounted in the shorter side bore, an actuating rod mounted for relative slidable movement in said longer side bore and having its respective ends projecting into said transverse recess and the space between said carrier and said clutch member, and a lever pivotally mounted in the transverse recess of the carrier and operably engaged with the lower end of said actuating rod and with the slidable pawl holder, said chuck, lever and clutch member having aligned axial openings extending therethrough in alignment with the carrier bore to permit the insertion and advancement of a stick of screws therethrough.

25. A screw driver adapted to drive into work the successive screws of a screw stick comprising a rotatable driving member having a non-circular opening in its lower end adapted to receive and drive a chuck, and a chuck having a non-circular outer periphery engageable in said non-circular opening and having a non-circular axial opening adapted to engage and drive a screw-head, said driving member having an axial opening in alignment with said chuck opening through which a screw stick may pass.

26. A screw driver adapted to drive into work the successive screws of a screw stick and having a longitudinal bore through which the screw stick may pass, said driver comprising a housing, a rotary motor, a rotatable clutch member operably connected with the motor and a rotatable screw driving assembly at the front portion of the housing comprising a rotatable cage having a chuck receiving portion at its lower end and a clutch element at its upper end in spaced relation from said clutch member, said cage being slidably mounted for relative axial movement to and from clutched engagement with said clutch member, a chuck removably carried by the chuck receiving portion of the cage for rotation therewith and adapted to engage and drive successive screws, and a retaining member detachably secured to the forward end of the cage for retaining the chuck in position in said cage.

27. A screw driver adapted to drive into work the successive screws of a screw stick, said driver comprising a housing, a rotary motor, a rotatable clutch member operably connected with the motor and a rotatable screw driving assembly at the front portion of the housing comprising a rotatable cage having a chuck receiving portion at its lower end and a clutch element at its upper end in spaced relation from said clutch member, a chuck carried by said cage and adapted to engage and drive a screw, said cage being slidably mounted for relative axial movement to and from clutched engagement with said clutch member, said housing, clutch member, rotatable driving cage and chuck having aligned axial openings extending therethrough to permit the advancement of a stick of screws therethrough.

28. A screw driver adapted to drive into work the successive screws of a screw stick and having a longitudinal bore through which the screw stick may pass, said driver comprising a housing, a rotary motor, a rotatable clutch member operably connected with the motor and a rotatable screw driving assembly at the front portion of the housing comprising a rotatable cage having a chuck receiving portion at its lower end and a clutch member, a chuck carried by said cage and adapted to engage and drive a screw, said cage being slidably mounted for relative axial movement to and from clutched engagement with said clutch member, a screw holding pawl carried by the cage and movable in a radial direction into the path of movement of a screw stick for retaining engagement therewith and a screw advancing pawl slidably carried by the cage for engaging a successive screw and advancing the same when the cage is moved to clutched and de-clutched positions respectively, said cage, chuck and pawls being rotatable and slidable axially as a unit.

29. A screw driver adapted to drive into work the successive screws of a screw stick and having a longitudinal bore through which the screw stick may pass, said driver comprising a rotatable driving cage having a non-circular opening at its front portion, a screw engaging chuck having a non-circular outer periphery engageable in said cage opening for rotation therewith, a screw holding pawl carried by the cage and movable in said chuck in a radial direction into the path of movement of said screw stick for retaining engagement therewith, and a screw advancing pawl slidably carried by the cage and longitudinally movable in said chuck for engaging a successive screw and advancing the same.

WALTER G. MITCHELL.

REFERENCES CITED

The following references are of record in the file of this patent:

UNITED STATES PATENTS

| Number | Name | Date |
|---|---|---|
| 1,369,894 | Jones | Mar. 1, 1921 |
| 1,944,653 | Clouse | Jan. 23, 1934 |
| 2,219,484 | Lyon | Oct. 29, 1940 |
| 2,256,012 | Blair | Sept. 16, 1941 |
| 2,322,024 | Hutchison | June 15, 1943 |
| 2,327,795 | Hutchison | Aug. 24, 1943 |
| 2,327,796 | Hutchison | Aug. 24, 1943 |
| 2,484,364 | Whitledge | Oct. 11, 1949 |
| 2,506,835 | Johnson | May 9, 1950 |

FOREIGN PATENTS

| Number | Country | Date |
|---|---|---|
| 429,016 | Great Britain | May 23, 1935 |
| 434,063 | Great Britain | Aug. 26, 1935 |